(12) United States Patent
Amer (10) Patent No.: US 6,766,346 B2
(45) Date of Patent: Jul. 20, 2004

(54) SYSTEM AND METHOD FOR COMPUTING A SQUARE OF A NUMBER

(75) Inventor: Maher Amer, Ottawa (CA)

(73) Assignee: Mosaid Technologies Incorporation, Kanata (CA)

( * ) Notice: Subject to any disclaimer, the term of this patent is extended or adjusted under 35 U.S.C. 154(b) by 580 days.

(21) Appl. No.: 09/725,927

(22) Filed: Nov. 30, 2000

(65) Prior Publication Data

US 2001/0018699 A1 Aug. 30, 2001

(30) Foreign Application Priority Data

Nov. 30, 1999 (CA) .............................................. 2291596

(51) Int. Cl.$^7$ ................................................ G06F 7/38
(52) U.S. Cl. ...................................................... 708/606
(58) Field of Search ........................................ 708/606

(56) References Cited

U.S. PATENT DOCUMENTS

| | | | |
|---|---|---|---|
| 5,195,052 A | 3/1993 | Karim | |
| 5,724,280 A | 3/1998 | Davis | |
| 5,974,436 A | * 10/1999 | Inoue et al. | ................. 708/606 |
| 6,032,169 A | * 2/2000 | Malzahn et al. | ............. 708/606 |
| 6,260,056 B1 | * 7/2001 | Dalal | ......................... 708/606 |
| 6,463,452 B1 | * 10/2002 | Schulist | ..................... 708/606 |

* cited by examiner

*Primary Examiner*—Tan V. Mai
(74) *Attorney, Agent, or Firm*—Kevin Pillay; Ogilvy Renault (57) ABSTRACT

A method for computing an intermediate result in squaring a number using a multiplier circuit of predetermined operand size, the method including the steps of representing a number to be squared as a vector of binary digits; grouping the vector into successive segments each having a length of the predetermined operand size; multiplying a first segment value by a second segment value to generate a first product value; the second at least one of the segment values to derive a second product value; halving the second product value to generate a halved second product value; accumulating the first product value with the halved second product value to generate an accumulated value; and doubling the accumulated value to generate the intermediate result.

5 Claims, 12 Drawing Sheets

| Operation | Binary | Flag | Symbols | Decimal Equivalent |
|---|---|---|---|---|
| | 1011 | | C | (11 in decimal) |
| x | 0001 | | D | (1 in decimal) |
| | 1011 | | $\overline{CD}$ | |
| shift $D^2$ right | 0000 → [1] | | $D^2/2$ | (flag set 1) |
| + | 1011 0000 | | CD $D^2/2$ | (add shifted $D^2/2$) |
| | 1011 | | CD+ $D^2/2$ | (11 in decimal) |
| shift left | 10111 ← [1] | | 2(CD+ $D^2/2$) | (23 in decimal) |

(5 bits required in final result, and the result is incorrect = 23)

Fig. 1

|  | A | B | C | D |
|---|---|---|---|---|
|  | E | F | G | H |
|  | HA | HB | HC | HD |
|  | GA | GB | GC | GD |
|  | FA | FB | FC | FD |
| EA | EB | EC | ED | |

Fig. 2

|  | A | B | C | D |
|---|---|---|---|---|
|  | A | B | C | D |
|  | DA | DB | DC | DD |
|  | CA | CB | CC | CD |
|  | BA | BB | BC | BD |
| AA | AB | AC | AD | |

| AA | 2AB | BB | 2AD | CC | 2CD | DD |
|---|---|---|---|---|---|---|
|  | 2AC |  | 2BC |  |  |  |
|  |  |  | 2BD |  |  |  |

Fig. 3(a)

| Operation | Binary | Symbols | Decimal Equivalent |
|---|---|---|---|
| | 1011 | C | (11 in decimal) |
| × | 0001 | D | (1 in decimal) |
| | 1011 | CD | |
| + | 0001 | $D^2$ | |
| | 1100 | $CD + D^2$ | (12 in decimal) |
| shift left: *11000* | | $2(CD + D^2)$ | (24 in decimal) |

*(5 bits required in final result, but result is incorrect = 24)*

Fig. 3(b)

| Operation | Binary | Symbols | Decimal Equivalent |
|---|---|---|---|
|  | 1011 | C | (11 in decimal) |
| shift left | 10110 | 2C | (22 in decimal) |
| x | 0001 | D | (1 in decimal) |
|  | 10110 | 2CD |  |
| + | 0001 | D² |  |
|  | 10111 | 2CD + D² | (23 in decimal) |

(5 bits required in multiplier — makes multiplier have a non-binary number of bits)

Fig. 5(b)

| Step | Instruction | POV | PHI | PLO | Temp | Description |
|---|---|---|---|---|---|---|
| ↓ | MW [BD] | 0 | 98 | 01 |  | Result of wide multiply BD is written into POV,PHI and PLO |
| ← | SHL [PHI,PLO] | 0 | 00 | 98 | 01 | Shift PLO into Temp register, PHI into PLO and POV into PHI sequently |
| ↑ | MACW [AD] | 0 | 98 | 99 |  | Do wide multiply AD and accumulate the result with contents of POV, PHI and PLO, then the result is written into POV,PHI and PLO |
| → | MACW [CB] | 1 | 97 | 00 |  | Do wide multiply CB and accumulate the result with previous accumulated result in POV,PHI and PLO, then the result is written into POV,PHI and PLO |
| ○ | SHL [PHI,PLO] | 0 | 01 | 97 | 00 | shift PLO into Temp register, PHI into PLO and POV into PHI subsequently |
| ± | MACW [CA] | 0 | 99 | 98 |  | Do wide multiply CA and accumulate the result with previous accumulated result in POV,PHI and PLO, then the result is written into POV,PHI and PLO |
| ″ |  |  | 99 | 98 | 01 | For final result, concatenate PHI,PLO,TempHI and TempLO together. |

Fig. 5(c)

| Step | Instruction | POV | PHI | PLO | Temp | Description |
|---|---|---|---|---|---|---|
| 1 | MW [BD] | 0 | 98 | 01 | | Result of wide multiply BD is written into POV,PHI and PLO |
| 2 | SHL [PHI,PLO] | 0 | 00 | 98 | 01 | Shift PLO into Temp register, PHI into PLO and POV into PHI subsequently |
| 3 | MACSW [AD] | 1 | 97 | 00 | | Do wide multiply-accumulate AD with *square option* (*this will cover MACW [CB]*), which multiplies AD, accumulates the result with halved contents of POV,PHI and PLO, shifts the accumulated value to left by one bit to get a double of the accumulated value and restores the shifted result into POV,PHI,PLO |
| 4 | SHL [PHI,PLO] | 0 | 01 | 97 | 00 | Shift PLO into Temp register, PHI into PLO and POV into PHI subsequently |
| 5 | MACW [CA] | 0 | 99 | 98 | | Do wide multiply CA and accumulate the result with previous accumulated result in POV,PHI and PLO, then the result is written into POV,PHI and PLO |
| 6 | | | 99 | 98 | 00 01 | For final result, concatenate PHI,PLO,TempHI and TempLO together. |

FIG 6(a)

1) Example 1
(2 segments)

```
        12   34
    ×   12   34
       408  1156
   144  408
      1156
```

$$\begin{array}{r} A\ B \\ \times\ A\ B \\ \hline AB\ BB \\ AA\ BA \\ \hline AA\ 2AB\ BB \end{array}$$

4 Multiplications are required → Prior art

3 Multiplications and 1 shift are required → Present invention

Required Result

```
     1234
  ×  1234
  1522756
```

Practice

Prior art:
```
       1156
    11  56  (Column change)
   408   AB
   419   BA
 + 408
   827

8  27  (Column change)
  144     AA
+ 152
```

Present invention:
```
       1156
    11  56  (Column change)   BB
   816                         2AB
 + 827

8  27  (Column change)    AA
  144
+ 152
```

3) Example 3
(4 segments)

```
             12   34   56   78
           x 12   34   56   78
         936 2652 3136 4368
    672 1156 1904 2652
408 1156 1904  936
144  672  408
```

Required Result
12345678
× 12345678
1524157765279684

|   | A  | B  | C  | D  |
|---|----|----|----|----|
| × | A  | B  | C  | D  |
|   | DA | DB | DC | DD |
|   | CB | CC | CD |    |
|   | BC | BD |    |    |
|   | AD |    |    |    |
|   | CA | BB | AC |    |
|   | BA | AB |    |    |
|   | AA |    |    |    |
|   | 2AD| 2BC| 2CD| DD |
|   | 2AB| BB | CC | 2BD|
|   | AA |    |    |    |
```

10 Multiplications and 6 shifts are required

Present invention

```
     DD
6084

60  84 (Column change)
         2CD
   8736
+  8796

87  96 (Column change)
         CC
    3136
    3223
+   5304
    8527

85  27 (Column change)
         2AD
    1872
    1957
+   3808
    5765

57  65 (Column change)
         BB
    1156
+   1213
```

Practice

Prior art

16 Multiplications are required

```
     DD
6084

60  84 (Column change)
         DC
   4368
+  4428
   4368
   8796

87  96 (Column change)
         DB
    2652
    2739
    3136
+   5875
    2652
    8527

85  27 (Column change)
         DA
     936
    1021
+   1904
    2925
```

FIG 6(c)ii

```
        BC
+  1904
   4829
        AD
+   936
   5765
        (65)(Column change)
+   57   CA
    672

+  729
   1156  BB

+ 1885
   672   AC

+        2557
    25   (57)(Column change)
+  408   AB
   433

+  408   BA
   841

+   (41)(Column change)
         AA
+  144
   152
```

```
        2AC
+ 1344
  2557
        (57)(Column change)
+   25  2AB
   816
   841
        (41)(Column change)
+    8   AA
   144
   152
```

SYSTEM AND METHOD FOR COMPUTING A SQUARE OF A NUMBER

This application claims priority from Canadian Patent Application Serial No. 2,291,596, filed Nov. 30, 1999.

This invention relates to the field of arithmetic circuits and more particularly to a system and process for multiplying a pair of numbers using a unique sequence of operations in a microprocessor.

BACKGROUND OF THE INVENTION

As is well known, the multiplication of two numbers may be laboriously performed by successively adding a multiplicand a multiplier number of times. One improvement of this method is to add a list of shifted multiplicands, each of which is computed according to the digits of the multiplier. In the case of a binary representation of a number a typical multiplication algorithm multiplies two N-bit words and produces a 2N-bit word product by simply adding each shifted multiplicand as it is created to a partial product. It may be noted, that when multiplying an N-bit number with an M-bit number in a computer, the resulting product will take at most N+M bits.

Computer microprocessors include parallel multiplier circuits so that multiplication of multi-digit numbers can be performed very quickly. This is true as long as the number of digits or the word width of the numbers to be multiplied does not exceed the number of bits that can be processed in parallel by a multiplier circuit.

In many applications such as for example in data encryption, the encryption keys are generally in the order of 1024-bits wide. In order to multiply numbers of this magnitude or larger, the binary representation of the number is sub-divided into successive segments of equal number binary digits each of which are successively processed. The successive results are then concatenated or combined to produce the final result. While this method requires additional clock cycles and control circuitry, the complexity of the multiplier circuit remains the same.

While much effort has been expended in developing efficient algorithms for multiplying two arbitrary numbers, an increasing number of applications now require frequent squaring operations to be performed. For example cryptographic processors normally perform multiple squaring operations during the encryption or decryption process. A few techniques have been proposed to efficiently square large numbers using fixed width multiplier circuits.

For example, in U.S. Pat. No. 5,195,052, which issued Mar. 16, 1993, there is described a method and corresponding circuit for performing exponentiation. There is no description in the subject patent of a specific or optimized method for squaring numbers. The patent treats squaring as another example of a general multiplication operation.

On the other hand, in U.S. Pat. No. 5,724,280 there is described an accelerated booth multiplier using interleaved operand loading. The patent describes an architecture for multiplying large word length operands and more specifically an apparatus which implements the booth multiplication algorithm in a faster manner than currently used multipliers by interleaving the loading of the operands with the re-coding and partial product accumulation operations.

The patent describes an efficient method for squaring the sum of two numbers $(A+B)^2$. The multiplier performs squaring operations by shifting the first operand value (A) by one bit, to double that value (2A) prior to multiplying by a second operand (B) to form the product to (2AB). This term is then accumulated with $A^2$ and $B^2$. Accordingly, the multiplication scheme of this patent is restricted to a specific sequence of operations in order to achieve a squaring of a sum of two numbers. The patent does not discuss or suggest how this is applied to squaring large numbers that exceed the operand register size of the multiplier.

Accordingly, there is a need for a system and method for optimizing a multiplication of large number operands in a computer processor.

SUMMARY OF THE INVENTION

In accordance with this invention there is provided a method for computing an intermediate result in squaring a number using a multiplier circuit of predetermined operand size, the method comprising the steps of:

(a) representing a number to be squared as a vector of binary digits;

(b) grouping the vector into successive segments each having a length of the predetermined operand size;

(c) multiplying a first segment value by a second segment value to generate a first product value;

(d) halving a second product value to generate a halved second product value;

(e) accumulating the first product value with the halved second product value to generate an accumulated value; and (f) doubling said accumulated value to generate said intermediate result.

BRIEF DESCRIPTION OF THE DRAWINGS

The invention will now be described in conjunction with the attached drawings in which.

DETAILED DESCRIPTION OF A PREFERRED EMBODIMENT

In the following description, like numerals are referred to as like elements in the drawings.

Figure 1:
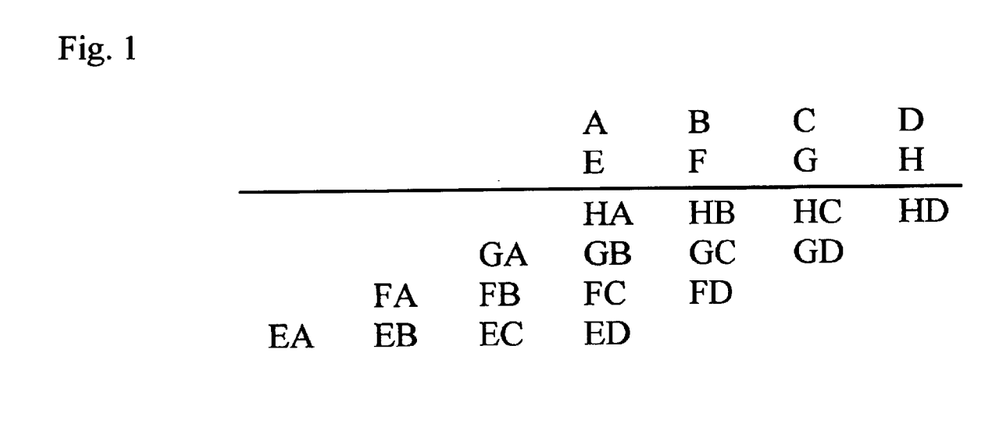
FIG. 1 is a symbolic representation of a sequence or steps for long multiplication.

Referring to FIG. 1, there is shown a well-known sequence of steps for multiplying two large numbers, and wherein the numbers are represented by a sequence of symbols. Large numbers are frequently used, in many different applications, such as in cryptographic applications, and are typically in the order 1024-bits long or greater. Although a multiplier circuit of this size is possible theoretically, practically it is not feasible given today's technology. Therefore, a 1024×1024 squaring operation must be implemented using plural smaller multiplier circuits such as 256-bit multiplier circuits for example. A method for multiplying large numbers, with a multiplier circuit that is capable of multiplying two 256-bit numbers is described as follows. Assuming one is to multiply 1024-bit numbers. Each number is sub-divided into four successive 256-bit segments, designated by letters [A, B, C, D] and [E, F, G, H], respectively, where each letter represents a 256-bit segment. Multiplication is performed on the segments using the fixed width multiplier circuit to form partial products of the segments. The partial products of the segments are then concatenated and shifted versions of the partial products are accumulated to yield the final product of the two large numbers.

More specifically, as shown in FIG. 1, the product of two segments is designated by adjacent symbols of each segment, thus the product of A and E is designated AE. It should be noted that the sequence shown in FIG. 1 is based on a positional arrangement of the symbols. Thus, the partial products are arranged in the appropriate columns for addition of the terms as shown. With this method, any number of segments may be processed. Although, if the number of segments is a power of two, the method is most efficient. For the four-segment number shown, the method requires sixteen multiplication's and five additions to generate the final product. Using this method, a total of sixteen multiplication and five addition steps are performed on the partial products in order to obtain the final product.

Figure 2:
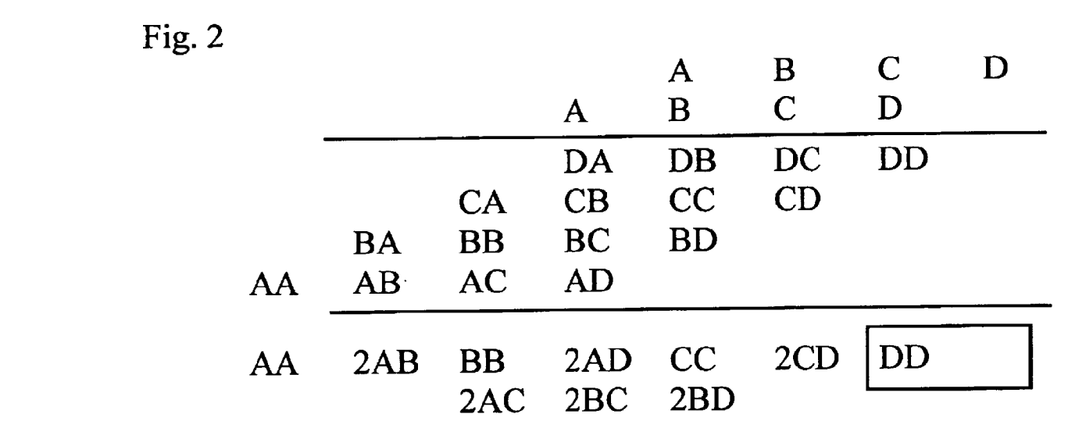
FIG. 2 is a symbolic representation of a sequence or steps for a squaring operation.

Referring now to FIG. 2, there is shown a sequence of steps for squaring a number. As in FIG. 1, the resulting partial products are shown positioned in their appropriate columns. If the sequence of steps as illustrated in FIG. 1 are used, then once again sixteen multiplications and five additions are required to obtain the final product. However, as is known, careful inspection of the partial products and applying the commutative property of multiplication to group terms in the partial products the number of multiplications are reduced from sixteen to ten and the number of additions are also reduced from five to three. As may be further observed, some of the terms in the final product simply require a doubling of a partial product. If the number is represented as a binary vector of digits, then a simple shift operation can be used to double the number. The direction of the shift will depend on the order of the bits in the representation. A shift operation is very fast, which is performed in a single instruction cycle.

The squaring of the four segment number [A, B. C, D] requires only ten multiplications, three additions and six shift operations. The overall efficiency of the multiplication is thereby improved dramatically.

While the above method is based on an observation of the partial products to implement a more efficient multiplication algorithm, a further improvement may be achieved by using the algorithm in conjunction with the well-known booth algorithm.

The present invention provides a further reduction in the number of operations required to produce a square of a number. In particular, the present invention is applicable to squaring large numbers. Prior methods are limited in that they rely on the shift operation being performed outside the multiplier circuit, since the internal circuit of most multiplier circuits is of a fixed width. Thus, assuming the multiplier processes 4-bit operands, a shift performed in the internal circuitry of the multiplier would require extending its operand data-bits to 5-bits, leading to a more complicated multiplier.

Multiplication is normally combined with an accumulate operation and is provided as a single multiply/accumulate instruction in a processor. It is more convenient to add each shifted multiplicand as it is created to a partial product. Incidentally, the partial products are normally a double word product. It may be observed in FIG. 2 that the partial product terms are shifted in order to implement a doubling of the term. This is different to the known multiply/accumulate approach where the multiplicand is shifted to the partial product.

Figure 3A:
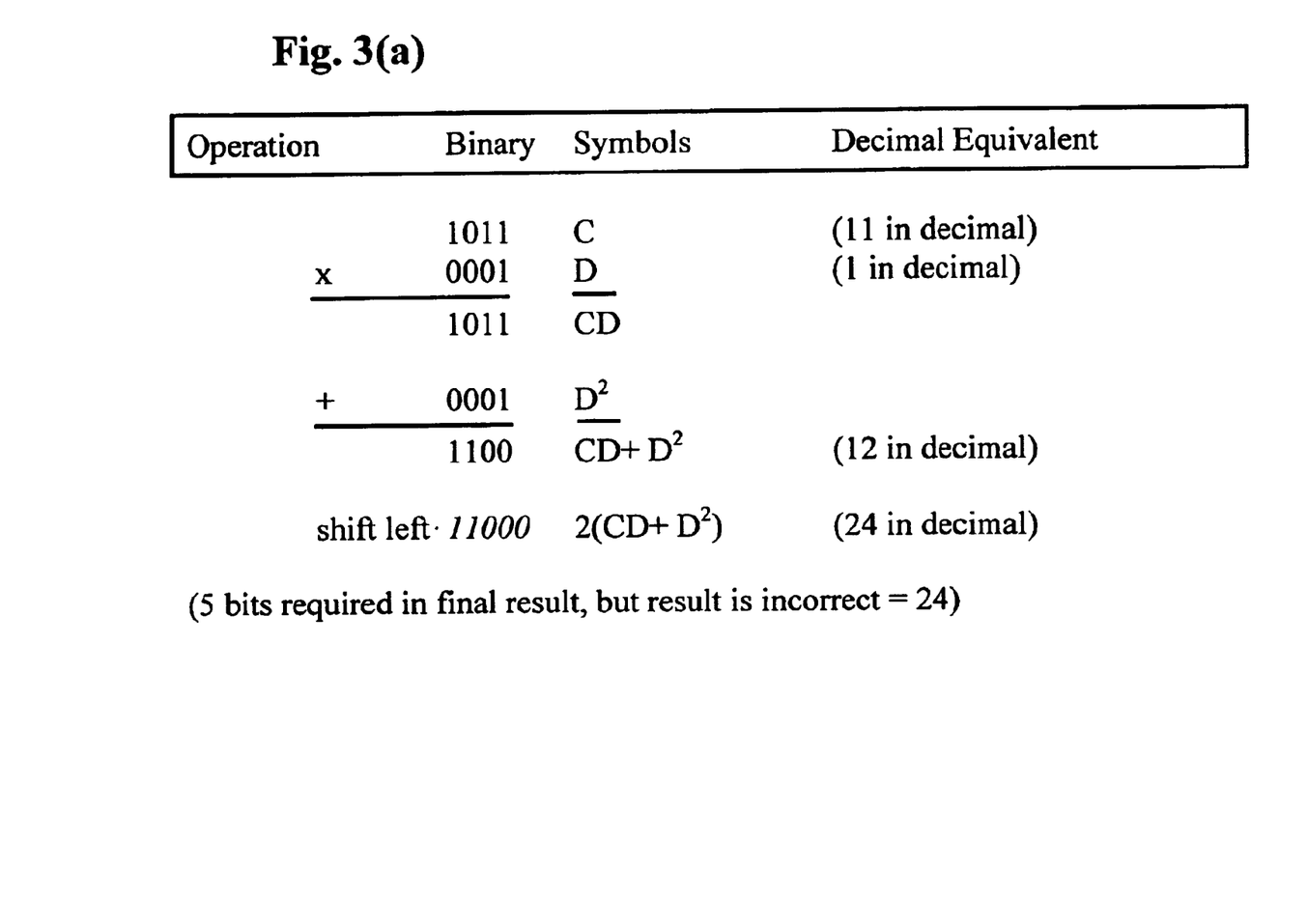
FIGS. 3(a) and 3(b) show a symbolic representation of a subset of steps for squaring a sum of two numbers.

For example, conceptually, as described in the prior art, a multiply/accumulate instruction would implement the expression $2CD+D^2$ by multiplying C and D together, shifting the result to the left and accumulating this result to $D^2$. The problem with this conceptual approach is that the shift operation affects the multiply/accumulate number, i.e. 2CD cannot be shifted by itself. Particularly, where the need is to in fact shift just the result of the multiply before the accumulate. Instead, $CD+D^2$ ends up being shifted. The result is therefore incorrect, since $2(CD+D^2)$ is not equal to $2CD+D^2$. This result is illustrated in FIG. 3($a$), where C=11 (for example), D=1 and all numbers are represented a 4-bit binary digits.

Figure 3B:
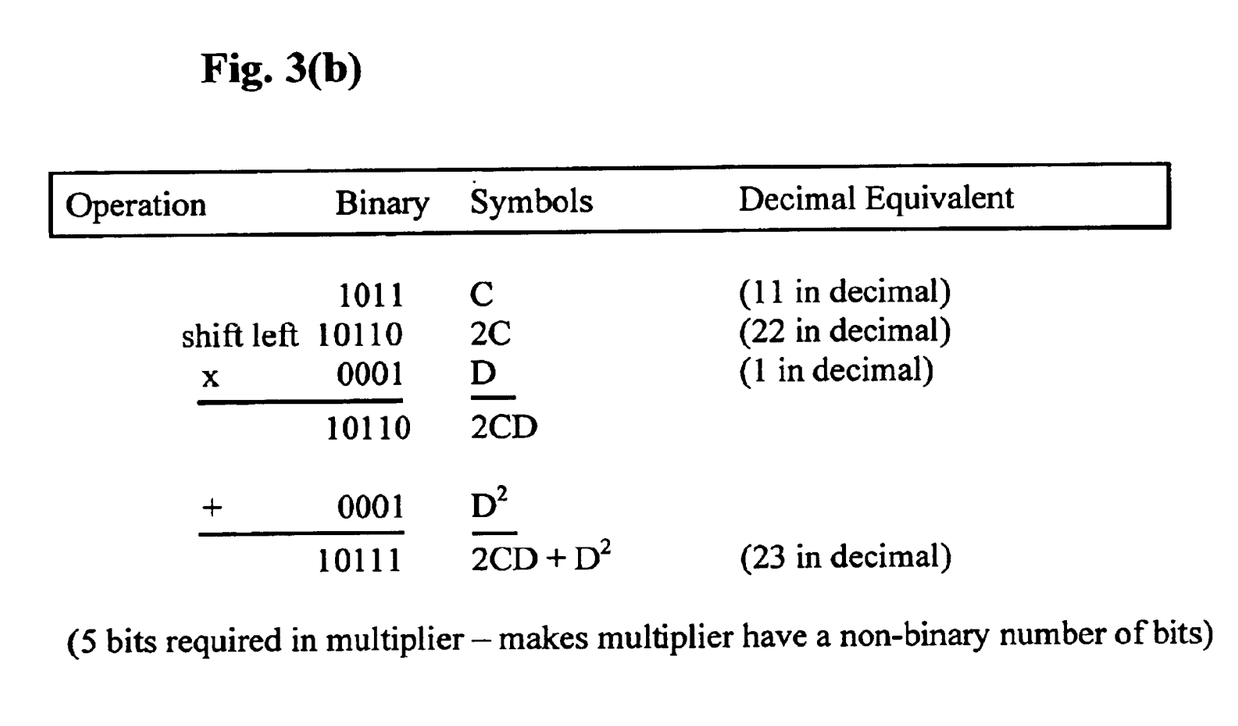

In FIG. 3($b$), there is illustrated one possible method for addressing this problem of shifting and accummulating. Specifically, the shifting (doubling) can be performed first and then the rest of the steps can be continued; i.e. step 1: 2C, step 2: 2C*D, step 3: 2C*D+$D^2$. In this case, the desired result is obtained, i.e. 23, but 5-bits had to be used to represent 2C. As mentioned earlier, this extra bit will complicate the multiplier circuit by requiting a non-power of two number of bits. Furthermore the symmetry in segmenting the numbers is lost.

Accordingly, the present invention attempts to provide a more efficient sequence of steps for obtaining the solution to $2CD+D^2$. With the present invention it was found we could save many clocks by reducing a number of multiplications in the case of multiplying two large identical numbers using a limited-width multiplier (where a single multiply operation typically required between 10–17 system clock cycles). The present invention addresses the problem of how to perform 2*CD or 2*CD+$D^2$ using a shift operation with a circuit that performs a multiply and accumulate as a single operation. One solution is to perform the computation $2(CD+D^2/2)$, where the $D^2$ referred to above can be understood simply as one of an existing previous partial result to be accumulated with the following multiplication operation.

Figure 4:
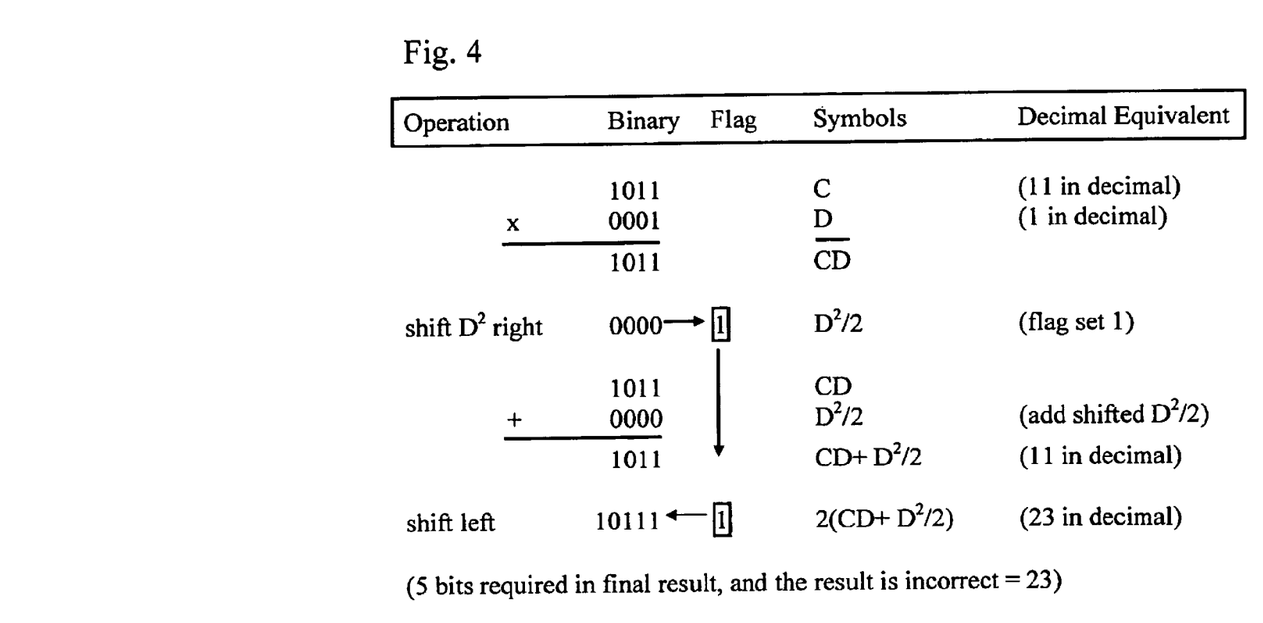
FIG. 4 is a symbolic representation of a subset of steps for squaring a segmented number according to the invention.

Referring now to FIG. 4, there is illustrated the process for implementing the multiply/accumulate with shift operation. Specifically, FIG. 4 illustrates the steps required to generate an intermediate result of $2CD+D^2$ which is perfonned during a square operation according to an embodiment of the invention. First the segments C and D are multiplied together to yield CD. Next, the $D^2$ is shifted RIGHT i.e. effectively divided by 2 (and rounded down—in this case ½→resulting in 0). This shift right operation yields a '1' which sets a flag denoting this "carry down" has to be re-incorporated into the final result later. Subsequently, the CD product and the right shifted $D^2/2$ terms are added together. Finally, the result of $CD+D^2/2$ is then shifted to the left, i.e. multiplied by 2 resulting in $2(CD+D^2/2)=2CD+D^2$, which is the desired result. Note that 5-bits (10111), representing the correct result "23" only appear in the final result and not in the multiplier, i.e. the multiplier does not requite 5-bit capability, or more generally, power of two number multiplying capability, which greatly simplifies and speeds up the squaring process. It should also be noted that the method for actually multiplying C and D may be implemented with known multiplication algorithms.

Figure 5A:
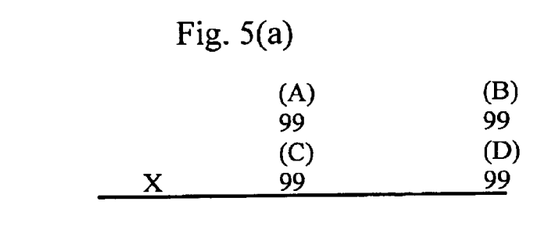
FIGS. 5(a), (b) and (c) show a sequence of steps for squaring a number, according to an embodiment of the invention.
Figure 5B:
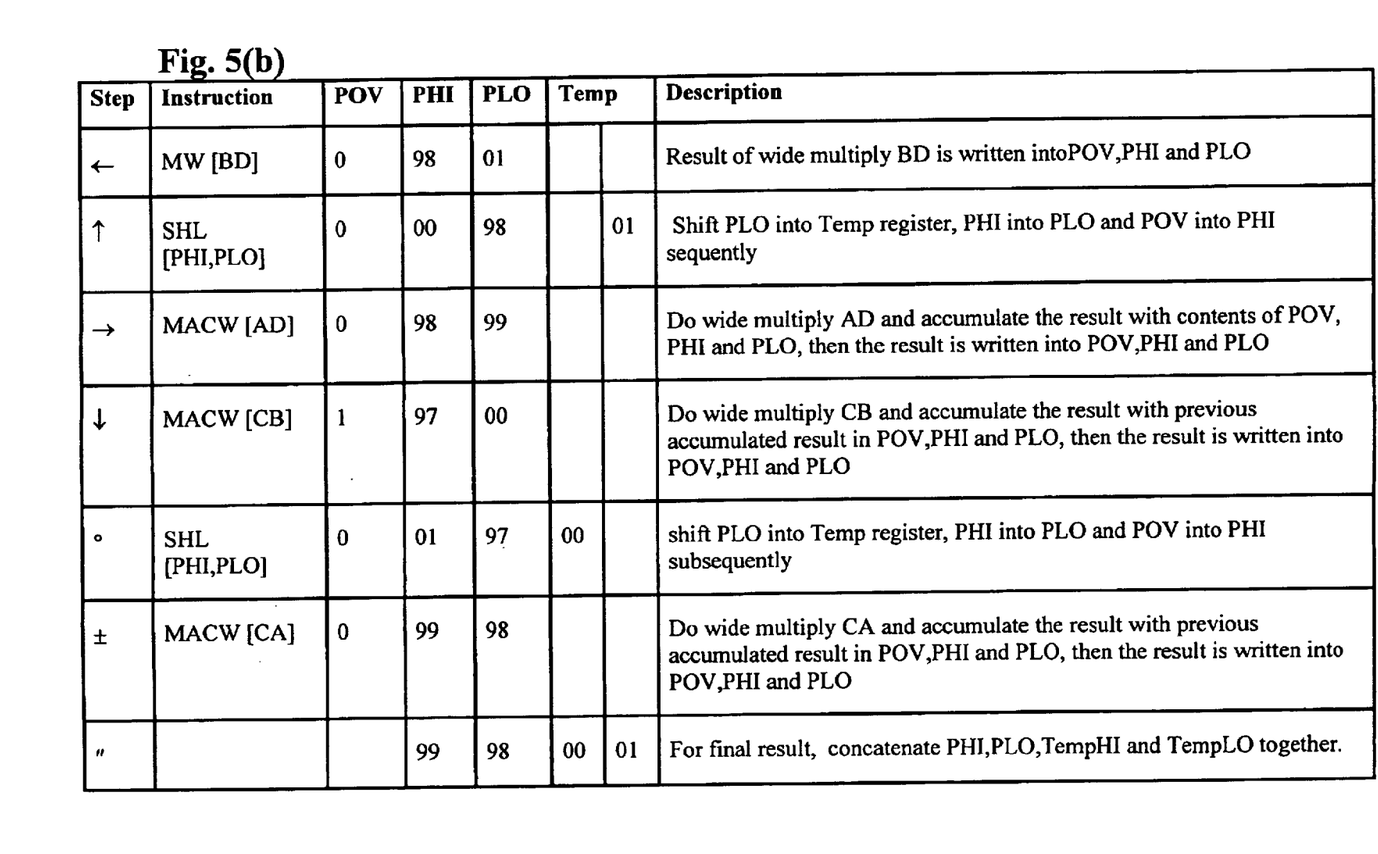
Figure 5C:
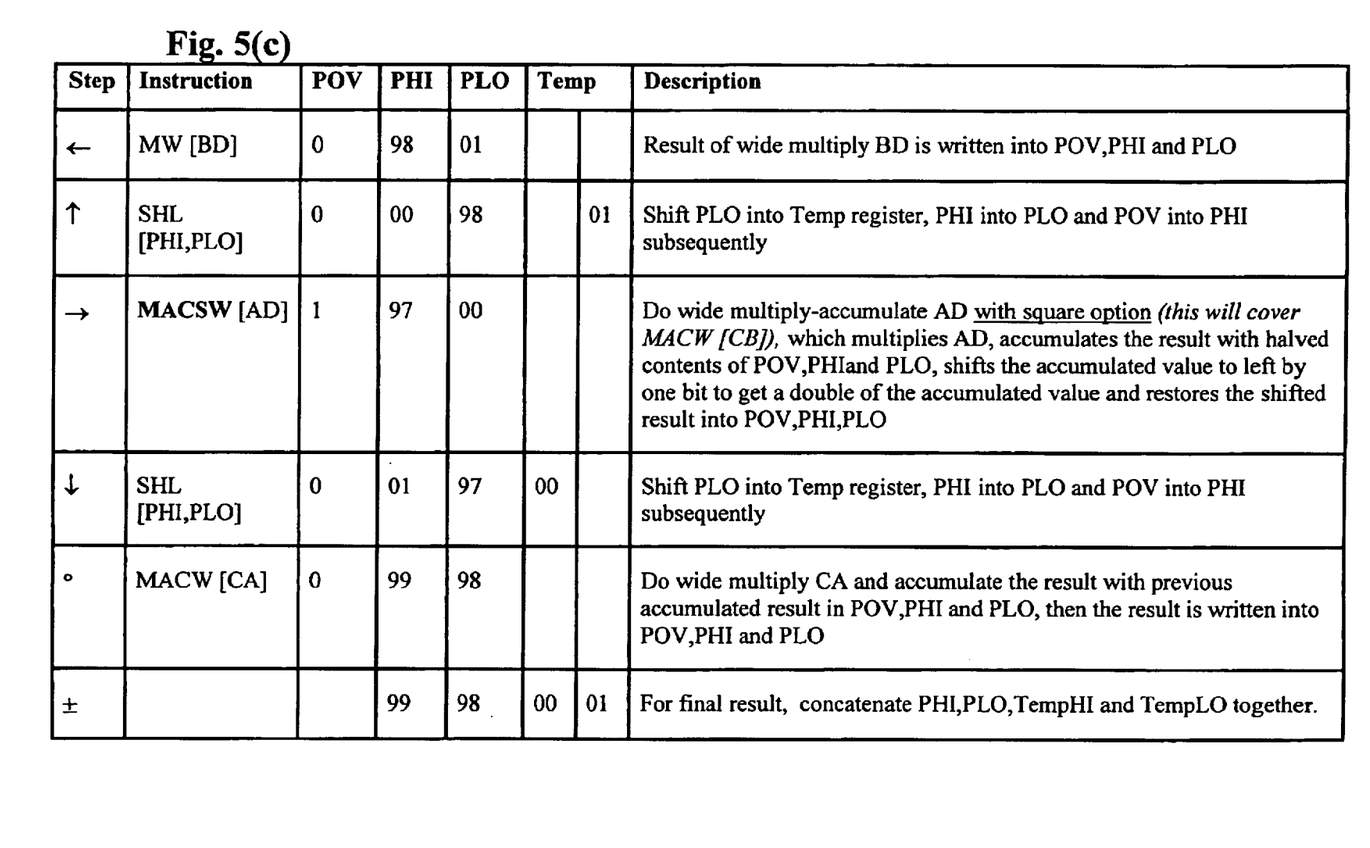

Referring to FIGS. 5(a) to 5(c), there is illustrated a sequence of steps for squaring a number "9999" (decimal) by using the multiply/accumulate and multiply/accumulate with square option methods described above.

The number is first segmented into parts A→99 and B→99 for the multiplicand and C→99 and D→99 for the multiplier. Decimal notation is used in this case in order to keep the explanation more concise, although clearly, a binary representatives would be used to actually implement the multiplication in a processor. The multiplier circuit can only handle a number of bits which is lower than the total number we want to square, in this case, the multiplier can be thought of as only being able to handle a two-by-two digit multiply (in decimal notation), i.e. "99"×"99".

In FIG. 5(b), a number of instructions are used which are defined as follows: MW[x,y] is a wide word multiply instruction used for multiplying two operands x and y; SHL[x,y] is a shift or column change instruction used to transfer the contents of x into y; MACW[x,y] is a wide word multiply/accumulate instruction used to multiply operands x and y and accumulate the result with a previous total. In FIG. 5(c) an additional instruction is used which represents one embodiment of the present invention: MACSW[x,y] which is a wide word multiply/accumulate instruction with the square option. All of these instructions are preferably software programmable by the user when initializing the operation of the multiplier block in the processor, although they may also be implemented in hardware solution.

The operation proceeds by performing a wide multiply instruction (MW) on B and D as shown in Step 1 of FIG. 5(b). The result of this multiplication is "9801" (decimal) and this result is stored in a product register comprised of three segments: POV (overflow), PHI (the high digits) and PLO (the low digits). In this case, "9801" would be stored as follows: PHI←98 and PLO←01.

In step 2, effectively a column change is occurring (SHL), and therefore, the contents of PHI are shifted into PLO while the contents of PLO are shifted into a Temp Register or directly into a data memory, depending on the software implementation of the multiplication instructions. This is prior to performing the subsequent multiplication in step 3. After this shift in step 2, designated as SHL[PHI,PLO], the new contents of PHI and PLO are PHI←00 and PLO←98.

In step 3, a wide multiply with accumulate (MACW) of AD is performed. The product of A and D is once again "9801" and when accumulated with the contents of PHI, PLO, i.e. 0098, yield the new current running total, "9899" of step 3.

Next, a wide multiply with accumulate (MACW) is performed on C and B. The product of C and B is "9801", is accumulated with the current contents of PHI, and PLO, "9899" to yield "19700" shown in step 4.

Note that there is an overflow, so the POV register is set to 1. Furthermore, since there is a change in column before proceeding with step 6, a shift (SHL) of the PHI and PLO contents is once again performed, yielding new contents in PHI and PLO as PHI←01 and PLO←97 shown in step 5. Next, in step 6, a wide multiply with accumulate option is performed on C and A, yielding "9801" as the product of CA and "9998" as the new accumulated total in step 6, based on adding "9801" with the current contents of PHI and PLO, 0197. Finally, in step 7, the final product of 99×99 is obtained by reading the current contents of PHI and PLO, "9998" and concatenating the bits which had been shifted into the Temp Register, i.e. 00 and 01 to yield the final result "99980001". The process described above and illustrated in FIG. 5(b) for multiplying 99 and 99 does not involve the squaring method described with reference to FIG. 4.

FIG. 5(c) illustrates the steps involved in calcualting "99×99" using a multiply/accumulate with square option instruction according to an embodiment of the invention. The process is similar to the one described in FIG. 5(b) except that instead of performing two separate and subsequent wide multiply/accumulate operations (MACW) first on AD and then on CB, since these two numbers are the same, i.e. 99×99, we can use the multiply/accumulate with square option instruction [MACSW] as shown in FIG. 5(c). The implementation of this operation, designated MACSW in step 3 allows the skipping of the extra multiply/accumulate step 4 associated with the multiplying of CB in FIG. 5(b). Therefore, one multiply/accumulate operation is saved by implementing the squaring option, which represents an improvement in speed.

Figure 6:
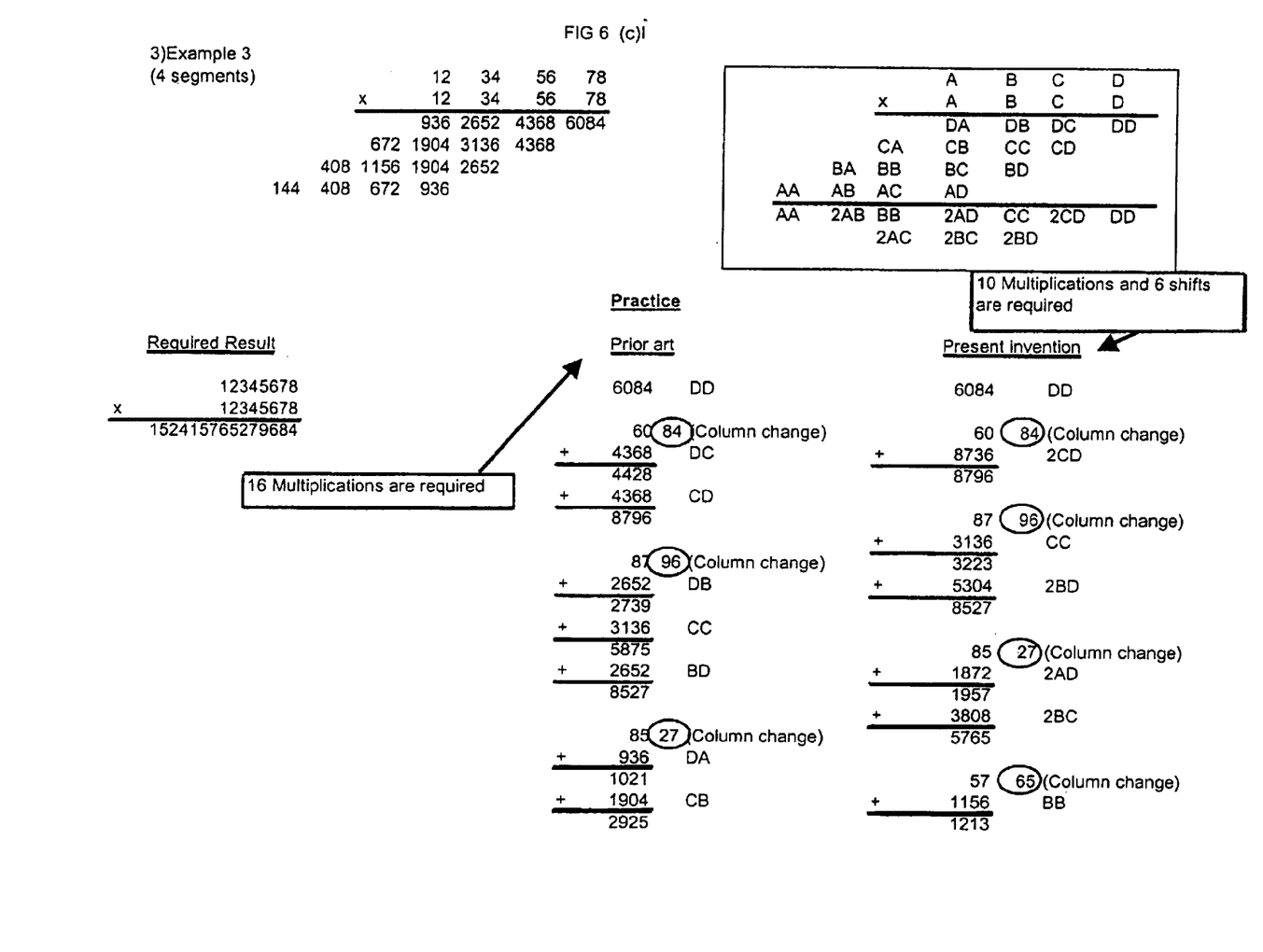
Figure 6A:
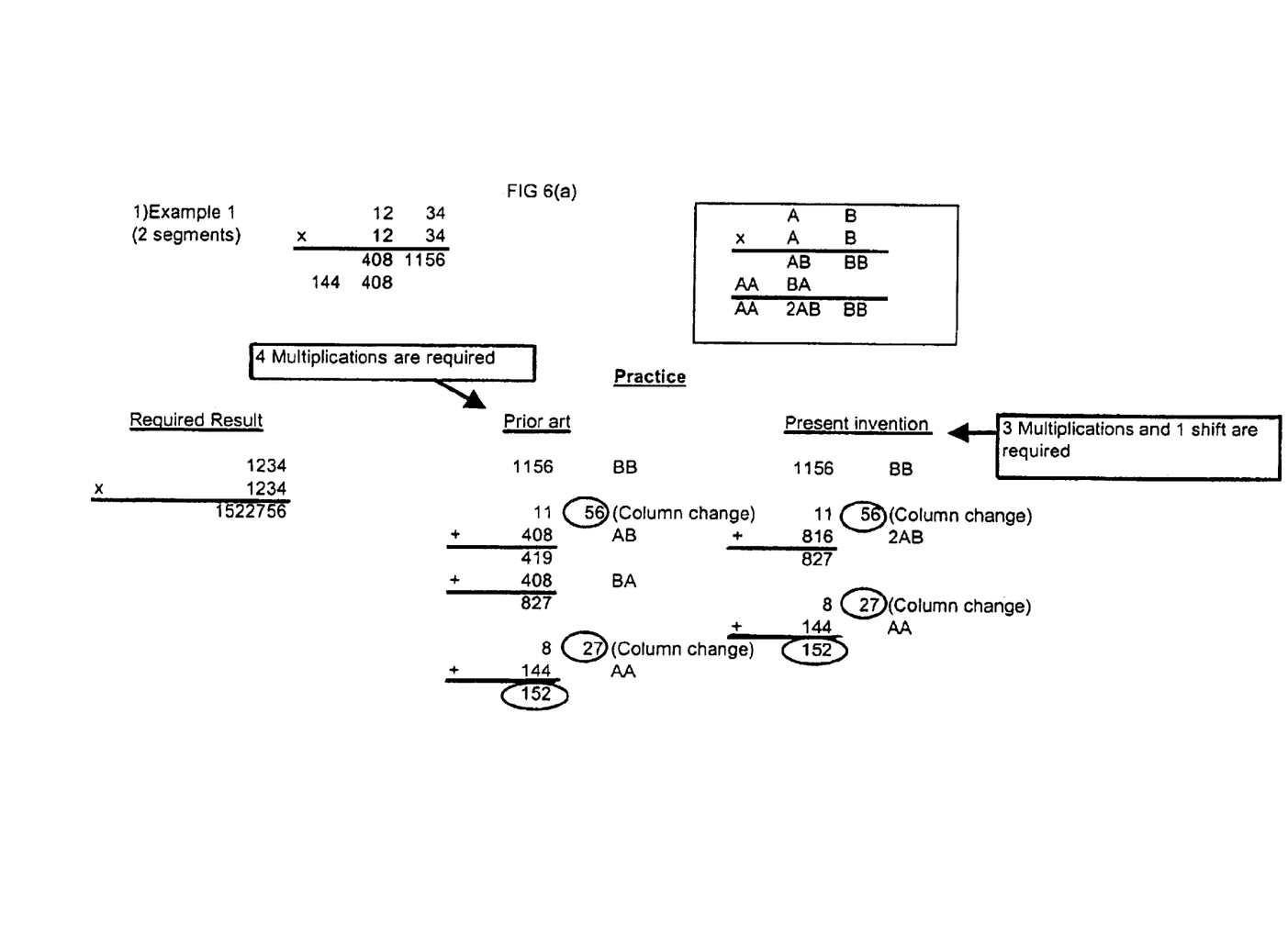
FIGS. 6(a), (b) and (c) show examples of computing a square using large numbers.
Figure 6B:
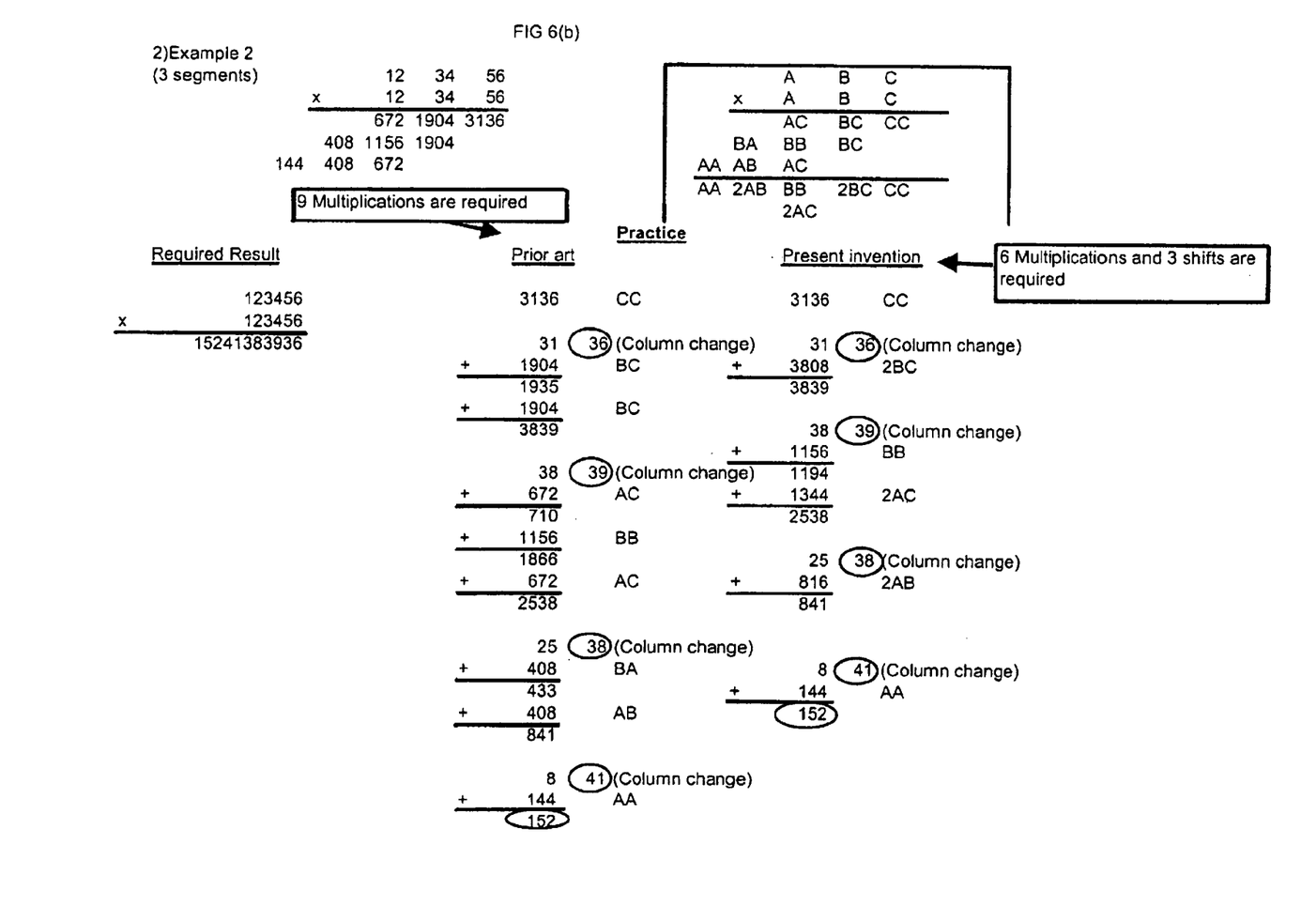
Figure 6C:
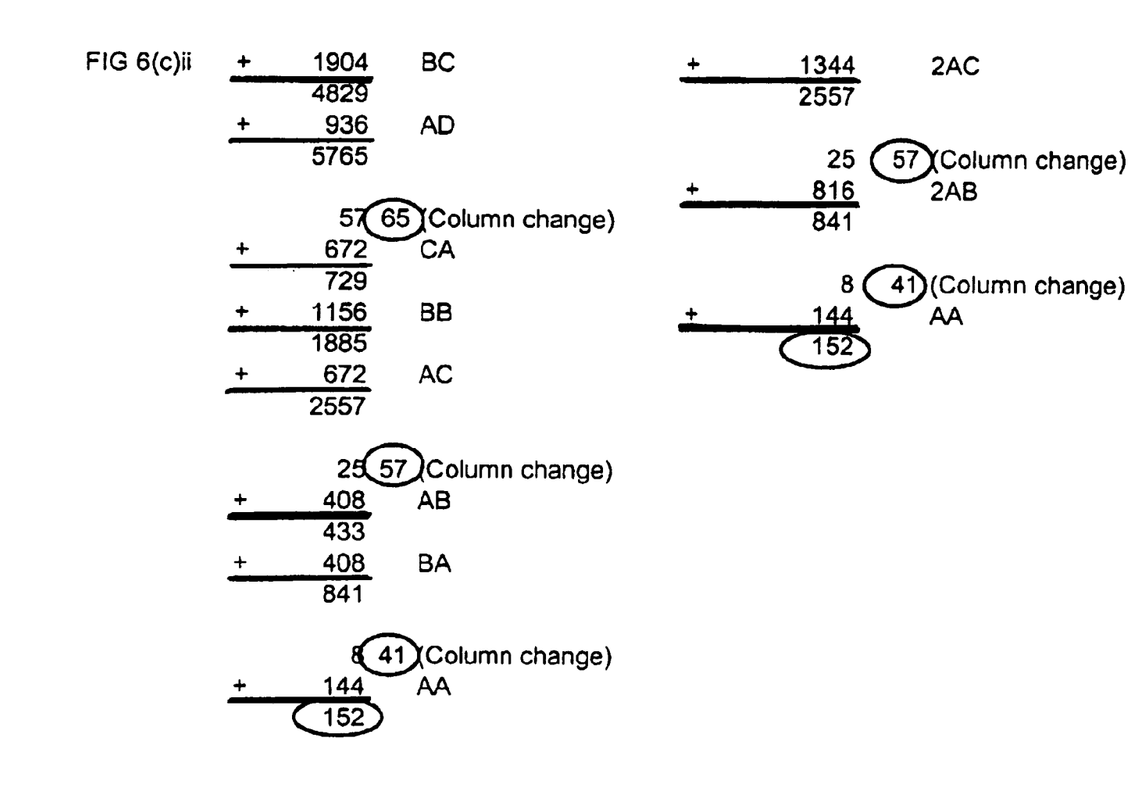

Referring to FIGS. 6(a), (b) and (c) there is shown respectively examples of using two segment, three segment and four segment numbers.

Figure 7:
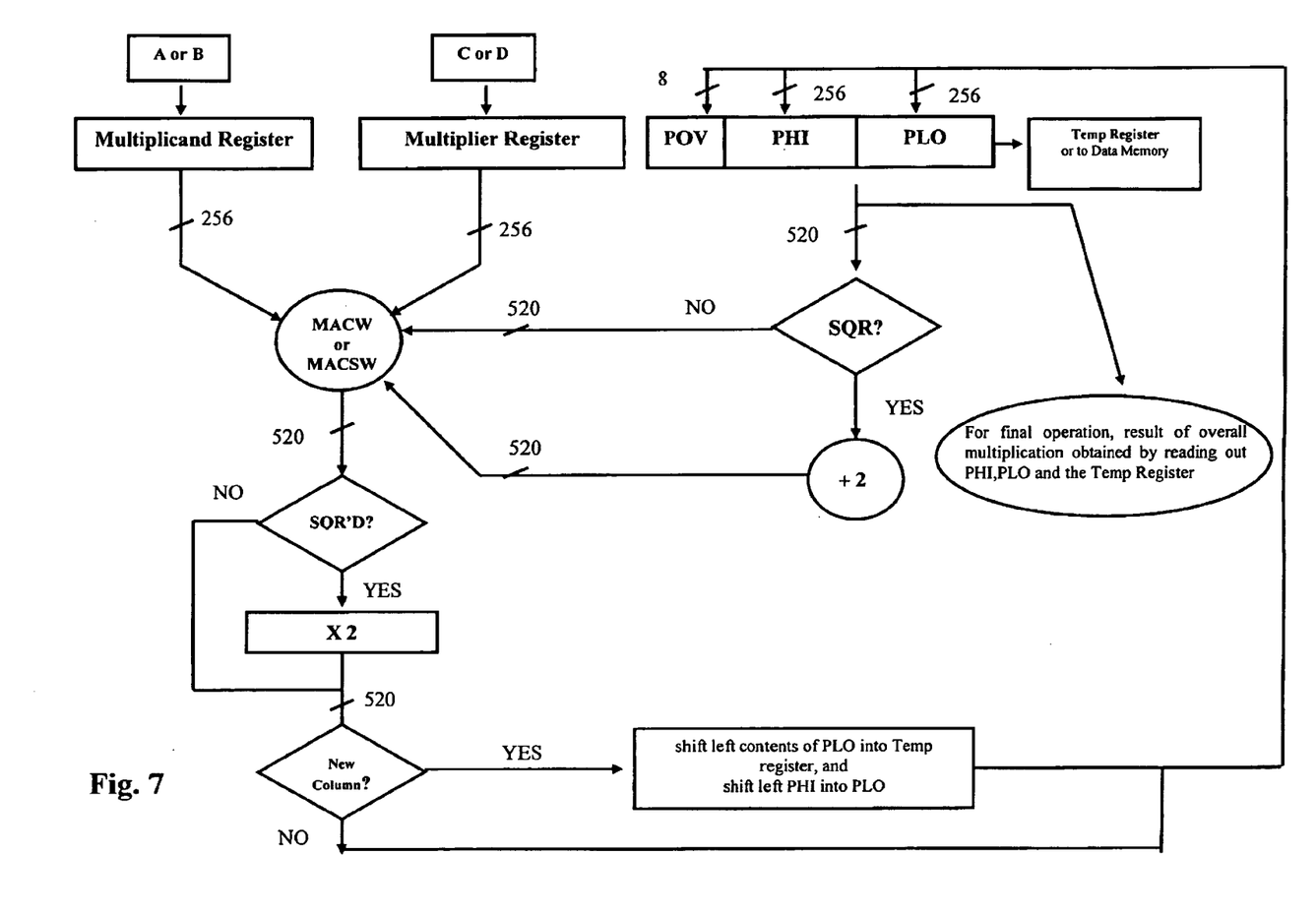
FIG. 7 is a schematic diagram of a process for squaring according to an embodiment of the invention.

Referring to FIG. 7 there is shown a schematic flow diagram 700 for implementing a squaring method according to an embodiment of the invention. A multiplicand register 702, a multiplier register 704 and PHI/PLO registers 706 are shown as 256-bits wide. The contents of the multiplicand register 702 (which may receive either B or A from the previous example of 99 99), and the multiplier register 704 (which may receive either C or D from the previous example) are multiply/accumulated with the current contents of PHI and PLO. If the square option is not specified, then the contents of PHI and PLO are used directly. If the square option is chosen as in FIG. 5(c), then the contents of PHI and PLO are divided by two, which in binary representation amounts to shifting the contents of PHI and PLO simultaneously right by one bit. That result is then used as the accumulated value in the multiply/accumulate operation. Once the multiply/accumulate operation has been completed, if the squaring option was not selected, then the result is used directly to determine whether a new column will be calculated. If the square option has been selected, the doubling property is now utilized, effectively shifting the entire 520-bit result to the left by one bit If a new column will be calculated next, then the shifting of PHI into PLO and PLO into Temp Register is performed, and then the contents of PHI and PLO are ready for the next multiply/accumulate operation. If no new column is to be calculated, then the PHI and PLO contents are loaded with the output of the new column. This process is continued, whether the squaring option is selected or not, until the final multiply/accumulate operation has been performed after which the final contents of PHI and PLO are read out and concatenated with the bits which were shifted into the Temp Register to yield the final product.

Figure 8:
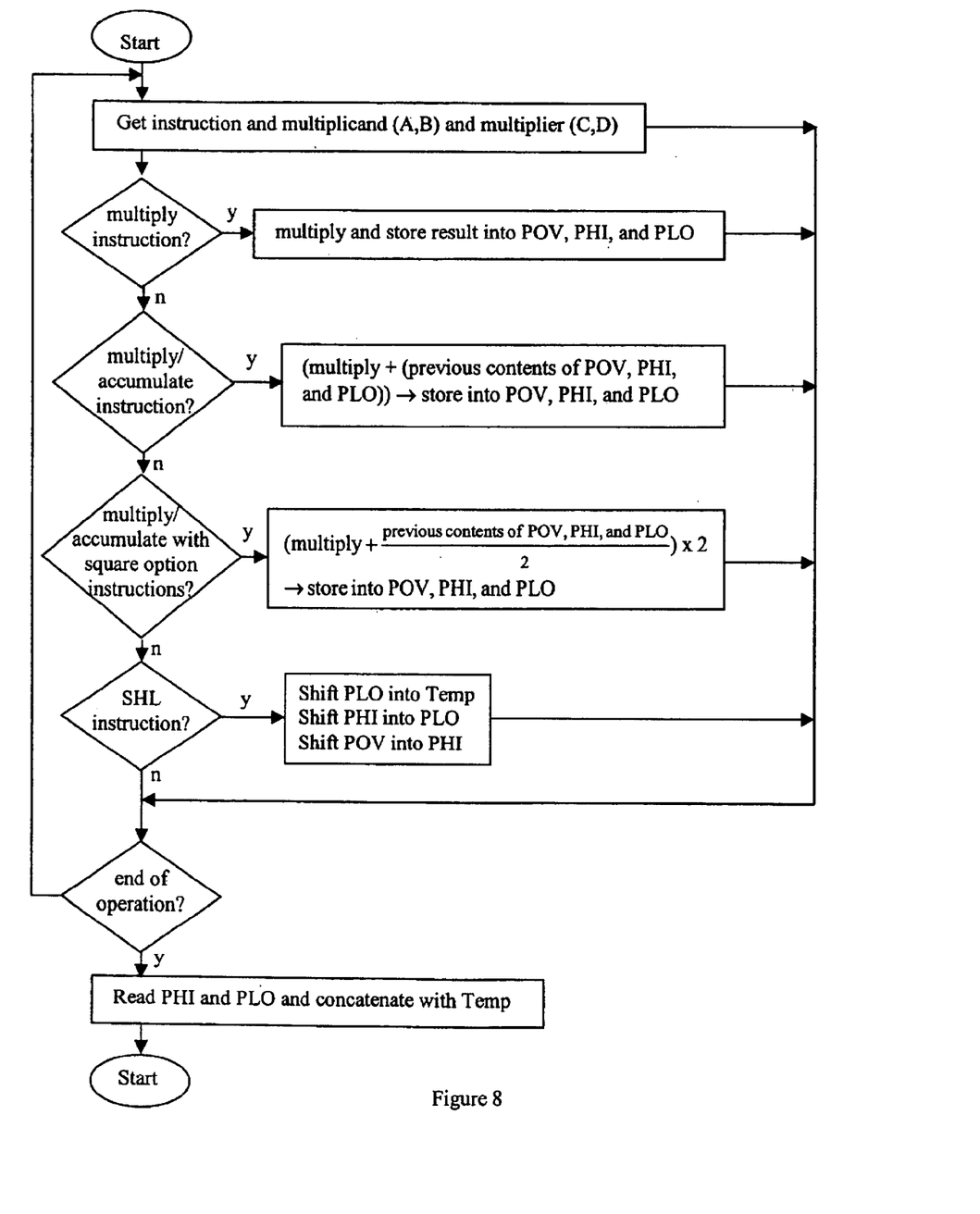
FIG. 8 is a flow chart of a process for squaring a number according to an embodiment of the invention.

The flow chart of FIG. 8, also shows a logic flow for the above method. In FIG. 8, the operation is initiated with step 800. The instruction and the operands are obtained in step 810. In step 820, the operation is verified to determine whether it is a multiply operation—if the answer to step 820 is yes, processing continues with step 830, whereby the operands are multiplied and the result is stored in the registers POV, PHI, PLO. Subsequently step 900 determines if the operation has been completed—if the answer is yes, then processing continues with step 910 whereby the contents of POV, PHI, PLO are concatenated with the contents of a temporary register to yield the final result. Processing ends, with step 920. If the answer to step 820 is no, processing continues with step 840 which determines if the issued instruction was a multiply/accumulate instruction. If the answer to step 840 is yes, then processing continues with step 850 whereby a multiplication of the operands is performed and accumulated with the current contents of POV, PHI, PLO and the result is stored in the same registers, i.e. POV, PHI, PLO. Processing then continues with step 900 and beyond as previously described. If the answer to step 840 is no, processing continues with step 860 which determines if the issued instruction was a multiply/accumulate with square option instruction. If the answer to step 860 is yes, then processing continues with step 870 whereby the contents of POV, PHI, PLO are shifted right one bit and then accumulated with the results of a multiplication of the operands provided by the instruction. Subsequently, the results of this step are all shifted left by one bit and then Though the above invention is described with respect to squaring because it is a common and easily identified operation, it is also useful when several segments are identical in order to reduce multiplication overhead. For example, when an 8-bit processor is used to process 256-bit operands, there is a substantial likelihood that several segments in an operand will be identical. These segments can be isolated and once one segment has been used to determine partial products, the partial products are inserted into appropriate columns for the other identical segments as well. For very large number arithmetic with small segments, this reduces the overall number of required multiply operations and thereby, saves time.

Numerous other embodiments can be envisaged without departing from the spirit or scope of the invention.

The embodiments of the invention in which an exclusive property or privilege is claimed are defined as follows:

1. A method for using a multiplier circuit of predetermined operand register size to compute an intermediate result in squaring large numbers, wherein the number exceeds the operand register size of the multiplier, said method comprising the steps of:
    (a) representing said number to be squared as a vector of binary digits;
    (b) grouping said vector into successive segments each having a length of said predetermined operand size;
    (c) loading said multiplier a first segment value and a second segment value to generate a first product value;
    (d) loading said multiplier with said first segment value to derive a second product value;
    (e) accumulating performing a right shift on a second product value to generate a halved second product value;
    (f) accumulating said first product value with said halved second product value to generate an accumulated value; and
    (g) doubling said accumulated value to generate said intermediate result.

2. A method for using a multiplier circuit of predetermined operand register size to compute an intermediate result in squaring large numbers, wherein the number exceeds the operand register size of the multiplier, said method comprising the steps of:
    (a) representing said number to be squared as a vector of binary digits;
    (b) multiplying a first of the numbers with a second of the numbers to generate a first product value;
    (c) squaring one of the numbers and shifting a binary representation of the square to halve said square value and setting a corresponding flag bit;
    (d) accumulating the first product value with said halved square value to generate an accumulated value;
    (e) shifting the accumulated value to double said accumulated value; and
    (f) incorporating said flag bit with said doubled accumulated value to generate said intermediate result.

3. A method of squaring a number using a multiplier circuit of predetermined operand register size comprising the following steps:
    (a) segmenting the number into a plural segments;
    (b) initializing a product register comprised of plural segments;
    (c) multiplying the second segment of the number by itself to generate a first partial product and storing the first partial product into the product register;
    (d) shifting contents of the product register into a temporary register according to a column change operation;
    (e) halving current contents of the product register;
    (f) multiplying the first segment of the number with the second segment of the number to generate a second partial product;
    (g) accumulating the second partial product with the halved contents of the product register to generate an accumulated value;
    (h) doubling said accumulated value and storing the doubled accumulated value in the product register;
    (i) shifting contents of the product register into a temporary register according to a column change operation;
    (j) multiplying the first segment by itself to generate a third partial product and storing the third partial product value in the product register; and
    (k) concatenating the current contents of the product register with temporary register to generate a final result.

4. A method as described in claim 3 wherein column change results in shifting a PLO register to a Temp register, a PHI register to the PLO register and an POV register to PHI subsequently.

5. A method for using a multiplier circuit of predetermined operand register size to compute an intermediate result in numbers, wherein the number exceeds the operand register size of the multiplier, said method comprising the steps of:
    (a) multiplying a first segment value of a number to be squared by a second segment value to generate a first product value;
    (b) halving a previous product value obtained by squaring said first segment value to generate a halved second product value;
    (c) accumulating said first product value with said halved second product value to generate an accumulated value; and
    (d) doubling said accumulated value to generate said intermediate result.

* * * * *

UNITED STATES PATENT AND TRADEMARK OFFICE
CERTIFICATE OF CORRECTION

PATENT NO. : 6,766,346 B2
DATED : July 20, 2004
INVENTOR(S) : Maher Amer

It is certified that error appears in the above-identified patent and that said Letters Patent is hereby corrected as shown below:

Title page,
Item [73], Assignee, should read -- Mosaid Technologies Incorporated --.

Column 4,
Line 64, "requite" is corrected to read as -- require --.

Column 6,
Line 44, "by one bit If" is corrected to read as -- by one bit. If --.

Column 7,
Line 17, after "then" the following is inserted -- stored back into registers POV, PHI, PLO. This step is a more general description of the steps illustrated in Figure 4. Processing then continues with step 900 and beyond as previously described. If the answer to step 860 is no, then processing continues with step 880 which determines whether the issued instruction was a change column instruction. If the answer to step 880 is yes, then the contents of PLO are shifted into the Temp register, the contents of PHI are shifted into PLO and the contents of POV are shifted into PHI respectively. Processing then continues with step 900 and beyond as previously described. If the answer to step 900 is no, processing continues with step 810. --.
Line 45, "multiplier a first" is corrected to read as -- multiplier with a first --.
Line 49, "accumulating" should be deleted.

Column 8,
Line 48, "result in numbers," is corrected to read as -- result in squaring large numbers, --.

Signed and Sealed this

Eighteenth Day of January, 2005

JON W. DUDAS
*Director of the United States Patent and Trademark Office*